(12) United States Patent  (10) Patent No.: US 7,841,461 B2
Nguyen et al. (45) Date of Patent: Nov. 30, 2010

(54) ROLLER TRANSPORT CONVEYOR AND METHOD

(75) Inventors: Thanh V. Nguyen, Wyoming, MI (US); Dennis J. Schuitema, Ada, MI (US); Mark S. Harkema, Grand Rapids, MI (US); Wayne A. Moshauer, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 114 days.

(21) Appl. No.: 12/246,015

(22) Filed: Oct. 6, 2008

(65) Prior Publication Data

US 2009/0101475 A1 Apr. 23, 2009

Related U.S. Application Data

(60) Provisional application No. 60/981,965, filed on Oct. 23, 2007.

(51) Int. Cl.
*B65G 23/44* (2006.01)
*B65G 47/00* (2006.01)

(52) U.S. Cl. .............................. 198/781.03; 198/781.09

(58) Field of Classification Search ............ 198/781.03, 198/781.04, 781.09, 815, 781.1
See application file for complete search history.

(56) References Cited

U.S. PATENT DOCUMENTS 3,910,405 A * 10/1975 Couperus et al. ......... 198/626.4
4,108,304 A * 8/1978 McKnight et al. ....... 198/781.09
4,133,425 A * 1/1979 Roach .................... 198/781.03
4,189,047 A * 2/1980 Beckius ...................... 198/778
4,193,492 A * 3/1980 Hammond ............. 198/781.04
4,293,065 A * 10/1981 Dyer et al. ............. 198/781.06
4,378,875 A * 4/1983 Allan et al. .................. 198/815
4,473,149 A * 9/1984 Vogt et al. ............. 198/781.04
4,502,593 A * 3/1985 van den Goor ......... 198/781.03
4,753,339 A * 6/1988 Vogt et al. ............. 198/781.03
5,244,081 A * 9/1993 Kajii et al. ................... 198/790
6,065,588 A * 5/2000 Cotter et al. ........... 198/781.06
6,223,888 B1 * 5/2001 Jahns .................... 198/781.03

FOREIGN PATENT DOCUMENTS

FR 2561630 A * 9/1985
GB 2120193 A * 11/1983

* cited by examiner

*Primary Examiner*—Mark A Deuble
(74) *Attorney, Agent, or Firm*—Van Dyke, Gardner, Linn & Burkhart, LLP

(57) ABSTRACT

A roller transport conveyor and method provides a device for conveying items along a plurality of rollers, in which the device may be set up and operated and serviced by manually raising and lowering one or more contact members that transmit force from a spring to urge a drive belt into contact with an underside of the rollers. The contact member is adjustable by raising and lowering the contact member to expand and contract the spring, or by raising and lowering a base on which the spring is supported, so that the drive belt may be engaged with and disengaged from the rollers. A gravity take-up includes a mass suspended from a cable that is routed to a pulley having the drive belt reeved thereon. The cable is wound upon a winch that compensates for belt stretch, or for belts of various lengths.

18 Claims, 8 Drawing Sheets

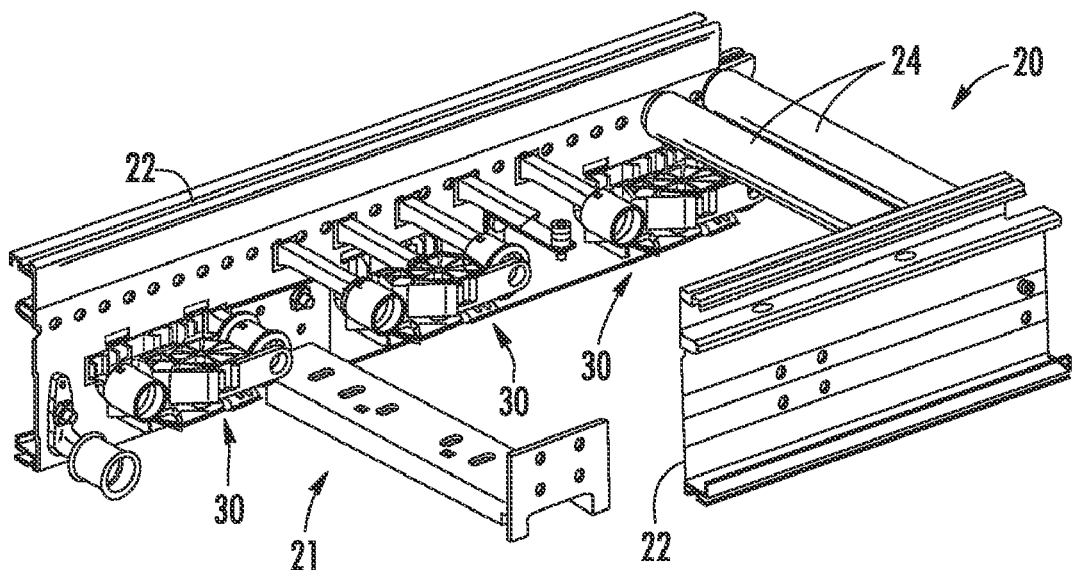
FIG. 1
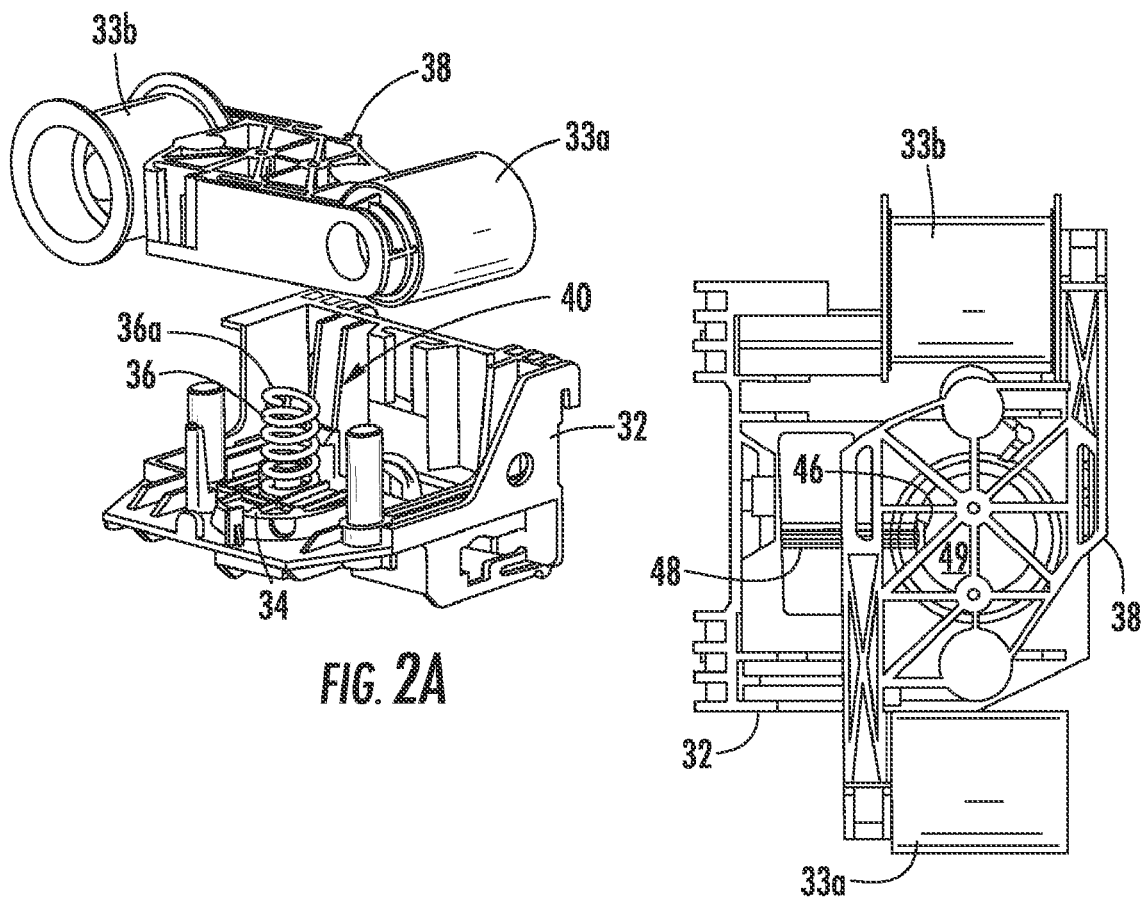
FIG. 2A
FIG. 2B

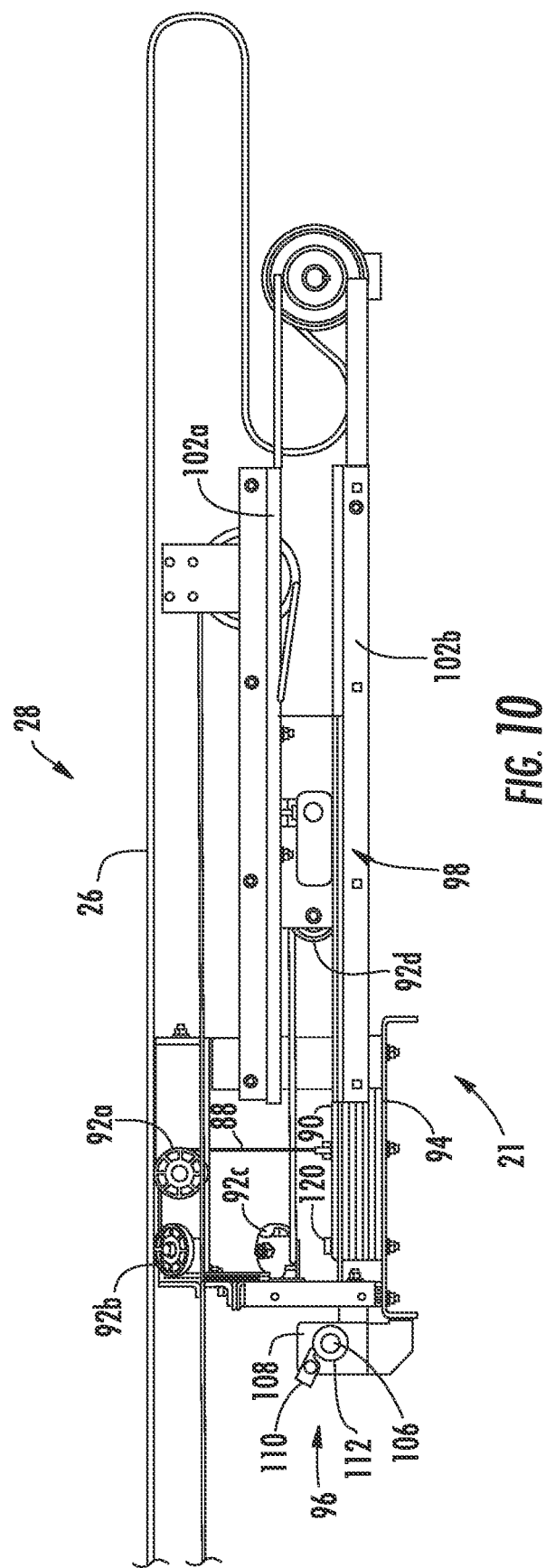

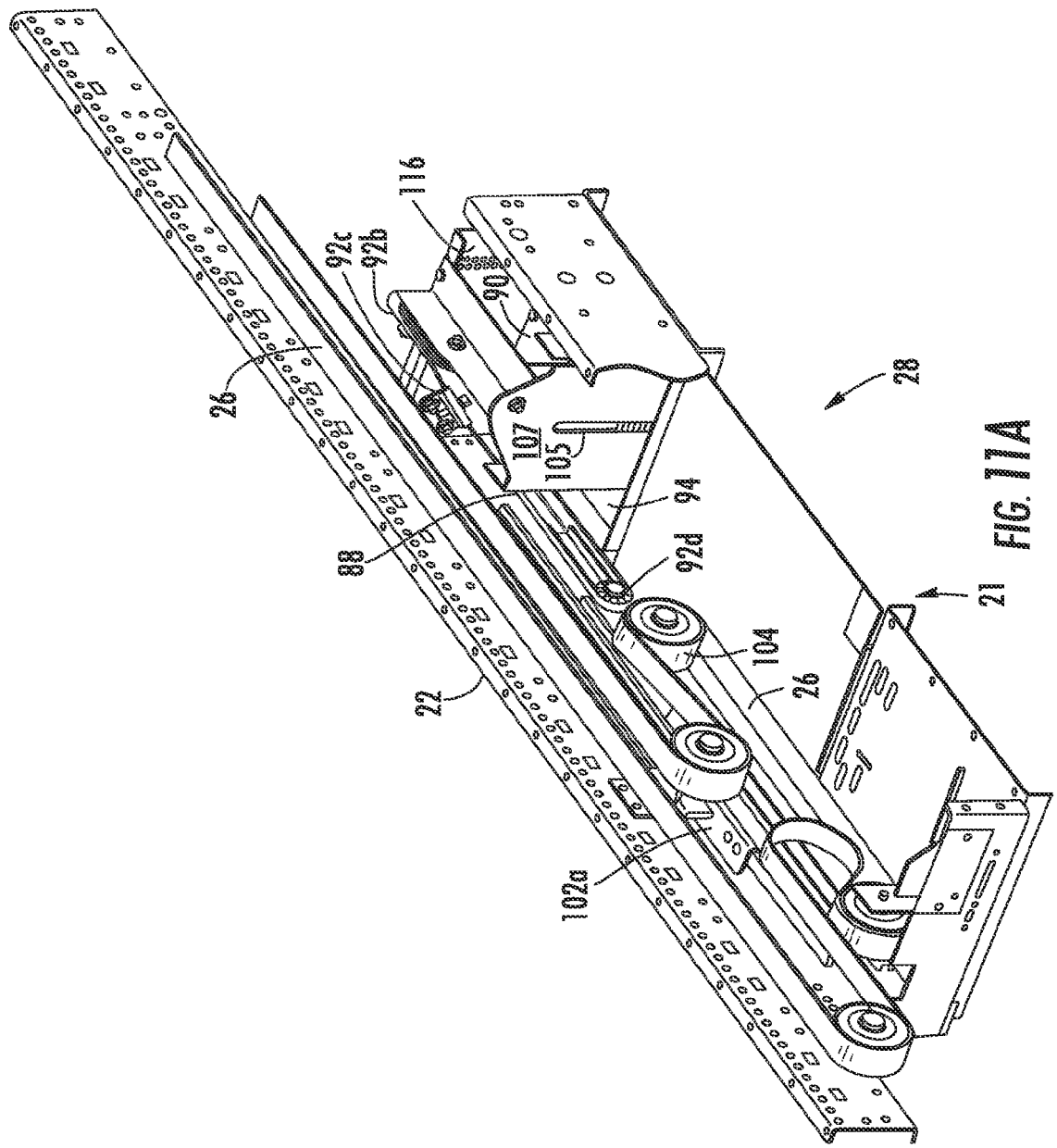

ROLLER TRANSPORT CONVEYOR AND METHOD

CROSS-REFERENCE TO RELATED APPLICATION

The present application claims the benefit of U.S. Provisional Application, Ser. No. 60/981,965, filed Oct. 23, 2007, which is hereby incorporated herein by reference in its entirety.

FIELD OF THE INVENTION

The present invention relates generally to powered conveyors and, more particularly, to powered roller conveyors.

BACKGROUND OF THE INVENTION

Roller transport conveyors are known to include a plurality of rollers for conveying objects such as packages thereon. The rollers may be powered by a drive device such as an endless drive belt that is driven by an electric motor or the like. A take-up device may be used to apply tension to the endless drive belt.

SUMMARY OF THE INVENTION

The present invention provides a roller transport conveyor that is suitable for continuously conveying articles along the conveyor. The present invention provides a roller transport conveyor that is relatively simple to assemble or set up, disassemble, and maintain because it does not require pneumatic, hydraulic, or other fluid power sources. The present invention further provides a take-up that maintains constant tension on a drive belt while facilitating adjustment of the take-up to account for belt stretch and/or for belts of different lengths.

According to one aspect of the invention, a transport conveyor conveys items in a direction of conveyance. A drive belt is biased into frictional engagement with the rollers for driving the rollers. A carriage assembly, including a support member, a contact member, a spring, and a retraction device, is operable to bias the drive belt upwardly to engage the rollers, and also to disengage the drive belt from the rollers. The support member is supported at the conveyor and the retraction device is movably mounted thereto. The spring is supported at the retraction device and the contact member is supported above the support member by the spring. The retraction device is operable to raise and lower at least a portion of the spring, which raises and lowers the contact member. Lowering the contact member biases the drive belt out of contact with the rollers.

The retraction device may be an adjustable base at a bottom portion of the spring. The adjustable base is movable between a lowered or retracted position and a raised or extended position relative to the support member. In the retracted position the spring is lowered so that the drive belt is no longer in frictional contact with the rollers. For example, the adjustable base may be rotatable relative to an outer element. The outer element has a passageway through which the adjustable base is received. A spiral channel at an inner surface of the outer element receives an axial protrusion at an outer surface of the adjustable base. The axial protrusion is operatively received in the spiral channel so that rotation of the adjustable base relative to the outer element causes the adjustable base to telescopically extend from the outer element. Alternatively, an axial protrusion may be located at the inner surface of the outer element and a spiral channel located at the outer surface of the adjustable base.

The retraction device may include a locking member at the adjustable base. The locking member engages the support member when the retraction device is in the extended position, which prevents the support member from inadvertently moving to the retracted position. The locking member is disengageable from the support member to permit the retraction device to move to the retracted position, thereby lowering the spring and the contact member.

The retraction device may include a movable clasp located adjacent the spring for retaining the contact member in the retracted position. A lever is connected at the clasp for biasing the clasp away from a catch at the contact member to permit the contact member to move to the extended position.

According to another aspect, a gravity take-up is provided for a transport conveyor. The gravity take-up includes a mass, a cable, a bracket assembly, at least one sheave, and a pulley. A first end portion of the cable is connected at the mass for suspending the mass above a surface, and the second end portion is connected at the conveyor. A drive belt is reeved upon the pulley, which is rotatably mounted at the bracket assembly. The sheave is rotatably mounted at the bracket assembly for engaging the cable. The mass imparts tension to the cable, which transmits tension to the belt via the sheave, the bracket assembly, and the pulley.

A plurality of sheaves may be incorporated for routing the cable along a desired path or route. A winch may be provided at the conveyor for windably receiving the cable at the cable's second end so that the winch is operable to raise and lower the mass. The winch may include a ratcheting device to prevent the cable from unwinding. The gravity take-up and the drive belt may be serviced by unwinding the cable from the winch until the mass is supported on the surface, after which further unwinding imparts slack to the cable and the drive belt.

These and other objects, advantages, purposes, and features of the present invention will become apparent upon review of the following specification in conjunction with the drawings.

BRIEF DESCRIPTION OF THE DRAWINGS

FIG. 1 is a perspective view of a portion of a conveyor bed in accordance with the present invention;

FIG. 2A is a partially-exploded perspective view of a first carriage assembly in accordance with the present invention and having a support member and a contact member;

FIG. 2B is a top plan view of the carriage assembly of FIG. 2A;

FIG. 10 is a side elevation of the gravity take-up device of FIG. 8;

FIG. 11A is a perspective view of the gravity take-up device of FIG. 8, taken from the opposite side, top, and end thereof.

DESCRIPTION OF THE PREFERRED EMBODIMENTS

Figure 8:
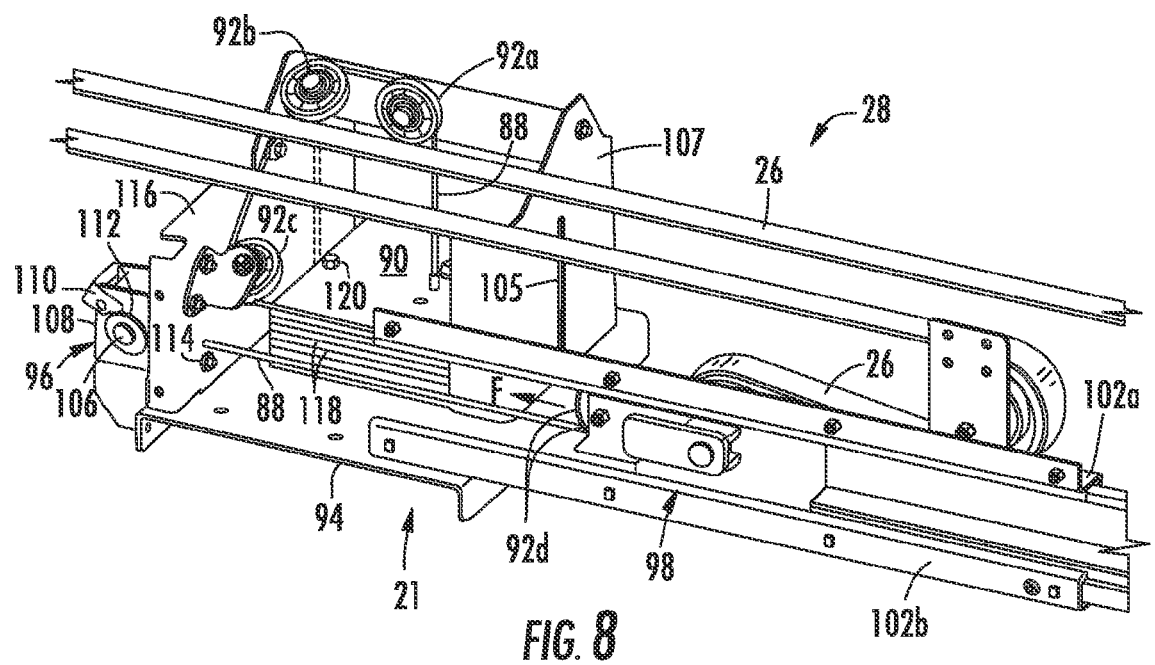
FIG. 8 is a perspective view of a gravity take-up device, taken from the side, top, and end thereof.

Referring now specifically to the drawings and the illustrative embodiments depicted therein, a roller transport conveyor 20 includes a frame 21 having a pair of spaced-apart side walls 22, a plurality of rollers 24 rotatably supported by sidewalls 22, an endless drive belt 26 for rotating the rollers, a gravity take-up 28 for maintaining a relatively constant tension on drive belt 26, and a plurality of carriage assemblies 30 for biasing drive belt 26 upwardly into frictional contact with rollers 24 (FIGS. 1 and 8). Gravity take-up 28 is capable of maintaining tension in drive belt 26 without a source of electrical or pneumatic or hydraulic power, as will be described in greater detail below.

Carriage assemblies 30 include a support member 32, a retraction device 34, a spring 36, and a contact member 38 (FIGS. 2A, 2B, 5, and 7A). Support member 32 is supported at side wall 22. Contact member 38 is movably supported on support member 32, and is vertically biased or adjustable thereon. A pair of wheels or pulleys 33a, 33b are rotatably supported at contact member 38 for supporting drive belt 26. It will be appreciated that any number of pulleys may be provided at each carriage assembly for supporting the drive belt, such as one pulley or three or more pulleys. Retraction device 34 is mounted at support member 32, and engages a lower end of spring 36. Spring 36 has a top portion 36a for engaging contact member 38 and urging contact member 38 upwardly relative to support member 32. Carriage assemblies 30, including support member 32 and contact member 38, are more fully described in commonly assigned U.S. Pat. No. 7,093,709 and U.S. Pat. No. 6,811,018, both of which are hereby incorporated herein by reference.

Spring 36 may be a coil spring that is vertically oriented to apply sufficient upward force to contact member 38 so as to urge drive belt 26 upwardly into frictional contact with the lower portions of rollers 24. Spring 36 is compressible or lowerable to move contact member 38 downwardly and to permit drive belt 26 to disengage from rollers 24, as will be described below. It will be understood that other types of springs may be suitable for use in place of coil spring 36. For example, leaf springs or resilient rubber or polymer blocks may be used to provide substantially the same function as spring 36 without departing from the spirit and scope of the present invention.

Figure 3:
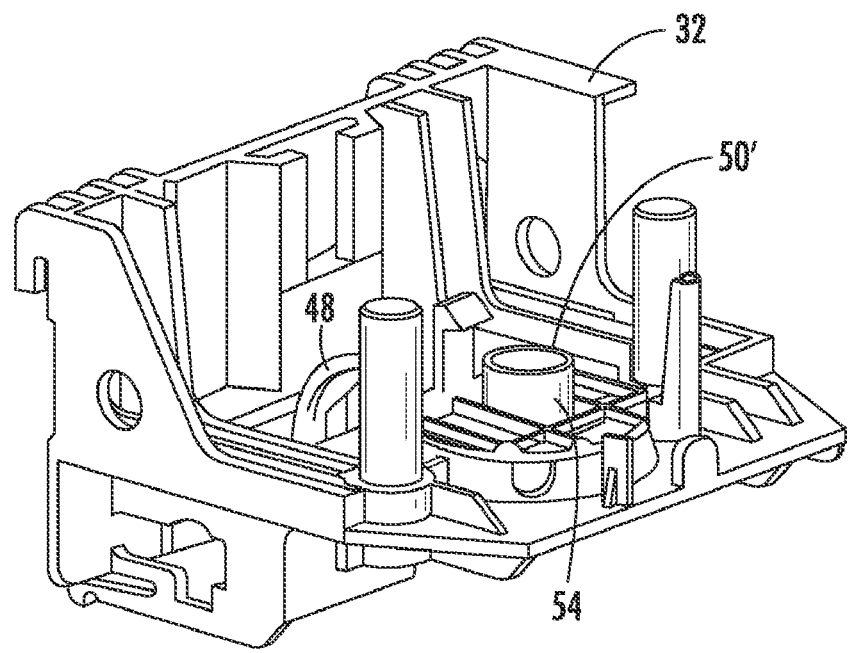
FIG. 3 is a perspective view of the support member of FIG. 2.
Figure 4:
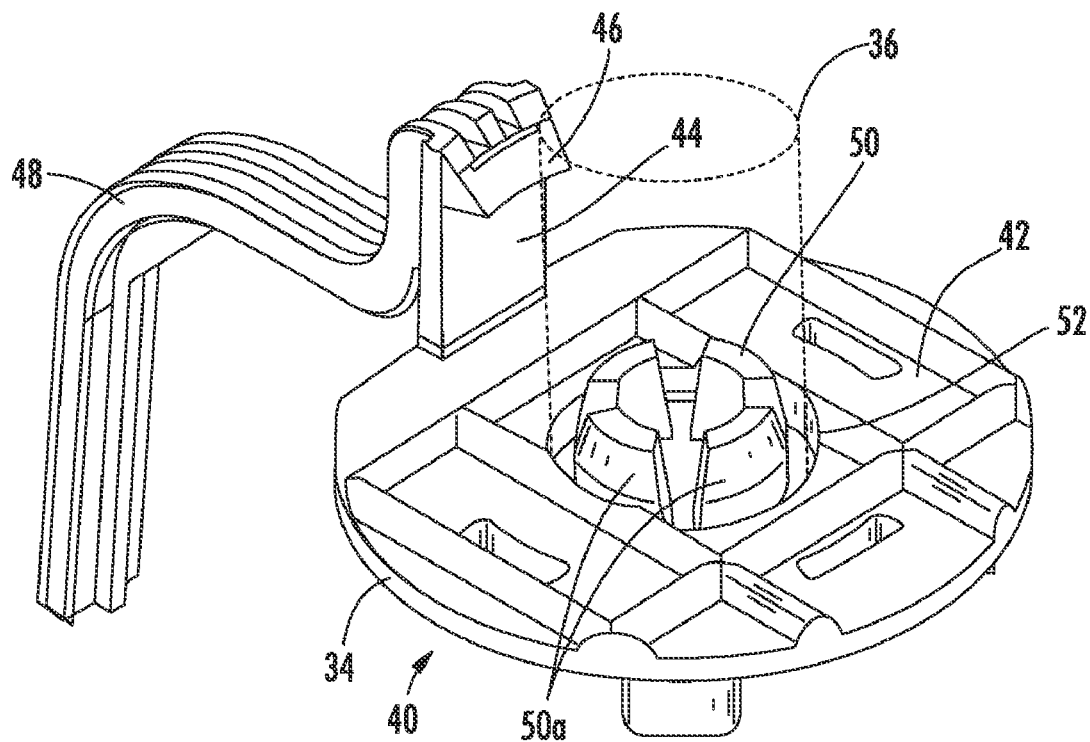
FIG. 4 is a perspective view of a retraction device useful with the support member of FIGS. 2 and 3.

Retraction device 34 facilitates the lowering of contact member 38 by an operator, such as when the operator desires to position the carriage for storage or transport, or to service conveyor 20 such as by replacing rollers 24 or drive belt 26. In the embodiment depicted in FIGS. 2A-4, spring adjusting device 34 is a contact member retainer 40 having a base 42, a projection 44 with a flange or clasp 46 for retaining contact member 38 in a lowered position with spring 36 in a compressed state. A handle or lever 48 is provided for disengaging clasp 46 from a catch 49 at a lower side of contact member 38. A spindle 50 maintains the alignment of spring 36. Base 42 is supported at support member 32 and includes a circular channel 52 for receiving the lower portion of spring 36 (FIG. 4).

Spindle 50 may include several projections 50a (FIG. 4), or may be a single-piece spindle 50' (FIG. 3) for supporting spring 36 in a substantially vertical orientation.

Spring 36 is manually compressible under catch 49 by lowering contact member 38 until clasp 46 engages a portion of catch 49 at the lower side of contact member 38. Catch 49 is a flat disc that is molded or formed at the lower side of contact member 38 and has a diameter greater than the diameter of spring 36. Catch 49 engages top portion 36a of spring 36 so that spring 36 supports contact member 38 at catch 49. Clasp 46 extends laterally outward from projection 44 a distance sufficient for clasp 46 to engage a portion of catch 49 when contact member 38 is lowered. Lever 48 permits an operator to bend projection 44 radially outward and away from catch 49 to release spring 36 from a compressed state to raise contact member 38 from its lowered position and to permit spring 36 to urge contact member 38 upwardly. Projection 44 is sufficiently strong and resilient to hold contact member 38 down and spring 36 in a compressed state while permitting projection 44 to flex and disengage from catch 49 without breaking. It will be appreciated that spring retainer 40 may be made from any sufficiently strong and resilient material, such as plastic, and may be molded as a single piece (FIG. 4), or formed unitarily with support member 32.

Figure 5:
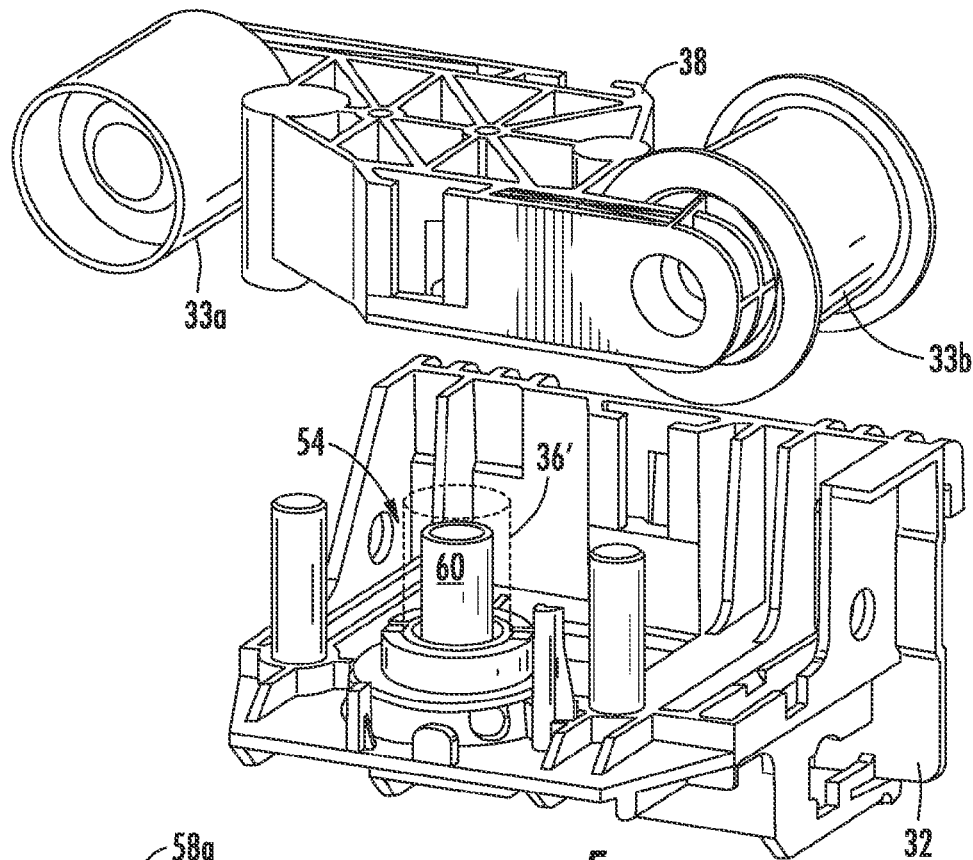
FIG. 5 is a partially-exploded perspective view of an alternative embodiment of a carriage assembly.
Figure 6:
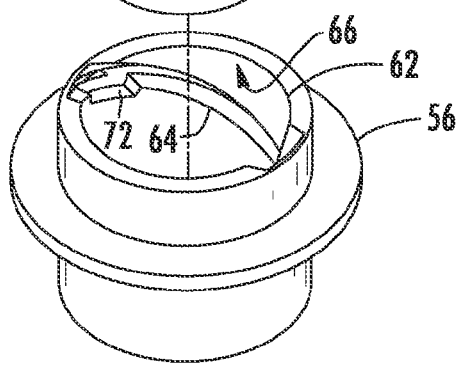
FIG. 6 is an enlarged exploded perspective view of a retraction device useful with the carriage assembly of FIG. 5.

In another embodiment, as shown in FIGS. 5 and 6, retraction device 34' is a telescoping assembly 54 having a base 56, a rotatable inner telescoping member 58, and a spindle 60. Base 56 is mounted at support member 32 and has a substantially cylindrical passageway 62 that is adapted to receive rotatable inner telescoping member 58. A pair of helical or spiral-shaped channels 64 are formed at an inner surface 66 of base 56, which defines the outer radial extent of cylindrical passageway 62. Rotatable inner telescoping member 58 has an outer surface 70 with a pair of projections 68 extending radially outwardly therefrom. Rotatable inner telescoping member 58 has an outer diameter that is at least somewhat smaller than the inner diameter of cylindrical passageway 62 of base 56 to permit rotatable inner telescoping member 58 to move freely relative to base 56. Radial projections 68 have a projection distance and an angle that are complimentary with the depth and angle, respectively, of helical channels 64. It will be appreciated by those skilled in the art that rotatable inner telescoping member 58 may be inserted into cylindrical passageway 62 of base 56 and radial projections 68 may be aligned with helical channels 64 so that when rotatable inner telescoping member 58 engages base 56, the rotation of rotatable inner telescoping member 58 relative to base 56 will cause rotatable inner telescoping member 58 to move axially vertically within base 56. Thus, it will be understood that radial projections 68 perform a similar function to conventional screw threads as projections 68 move along channels 64.

Alternatively, helical channels may be formed at a rotatable inner telescoping member and projections formed at a base in order to effect telescopic extension of the rotatable inner telescoping member relative to the base. It will also be understood that, optionally, inner telescoping member may be held stationary and the base rotated relative to the inner telescoping member to effect telescopic extension. It will be appreciated that channels having varying non-helical shapes, such as vertical channels or channels having a zigzag pattern, for example, may be used to permit telescopic extension of a rotatable inner telescoping member relative to a base or other telescoping member.

Rotatable inner telescoping member 58 may have a diameter further corresponding to the diameter of a coil spring 36', similar to spring 36, such that the spring's bottom end is supported at a top surface 58a of rotatable inner telescoping member 58. Helical channels 64 incorporate detents 72 at their upper ends for securely holding rotatable inner telescoping member 58 at a raised position (FIG. 5) when radial projections 68 engage detents 72. Thus, it will be appreciated that rotatable inner telescoping member 58 is telescopically raisable in base 56 by rotating rotatable inner telescoping member 58 in a counterclockwise direction relative to base 56 (when observed from above), and lowered by rotating inner telescoping member 58 in a clockwise direction, relative to base 56. Inner telescoping member 58 may be grasped directly and rotated by hand from below, for example, or may include a handle or tool receiver (not shown) to facilitate rotation by hand or with a tool, such as a screwdriver or wrench or the like.

Accordingly, it may be observed that when spring 36' is installed at top surface 58a of inner telescoping member 58, the lowering of rotatable inner telescoping member 58 by rotation in a first direction (clockwise when observed from above) will cause spring 36' to move to a lowered position, thus lowering contact member 38. Similarly, rotation of rotatable inner telescoping member 58 in a second direction (counterclockwise) moves spring 36' upwardly to raise inner telescoping member 58, thus causing spring 36' to urge contact member 38 upwardly, and urging drive belt 26 into frictional contact with rollers 24.

Figure 7A:
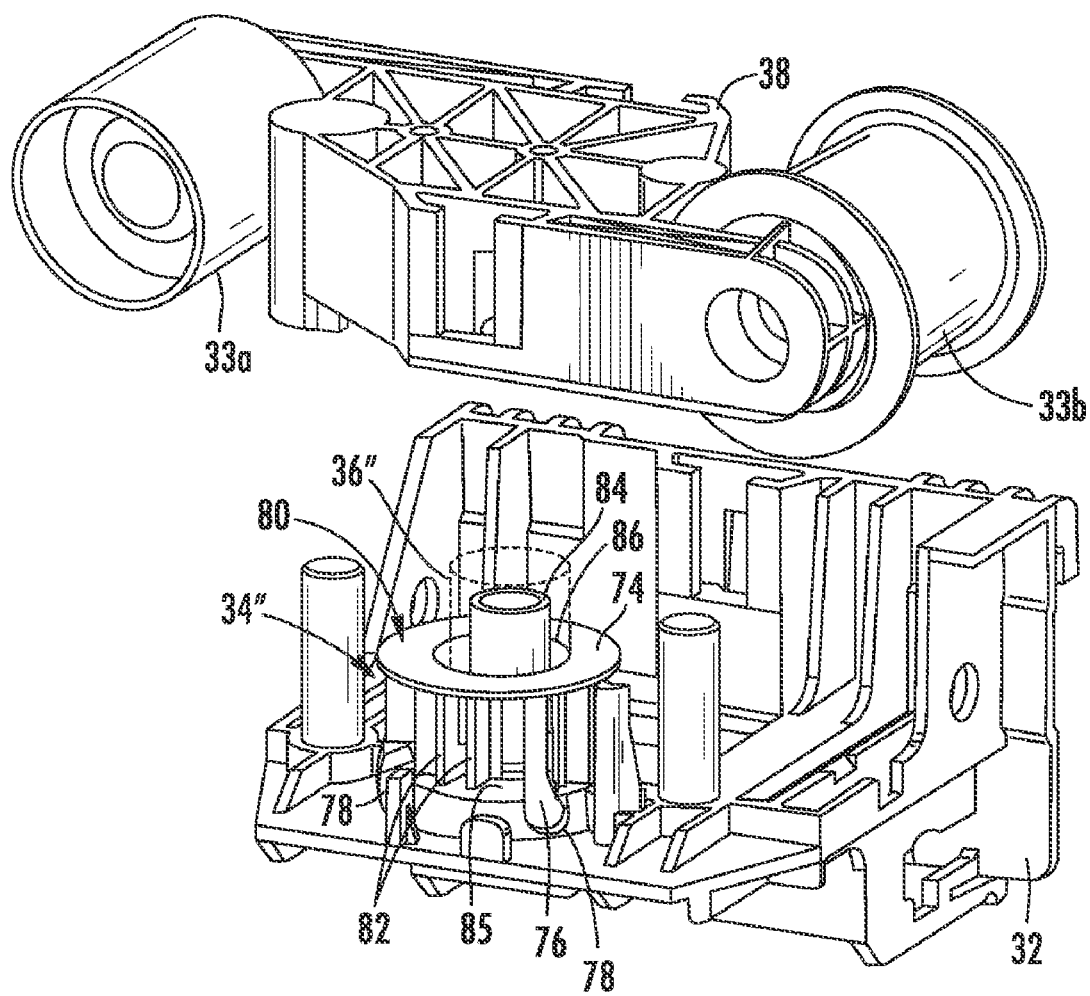
FIG. 7A is a partially-exploded perspective view of another alternative embodiment of a carriage assembly.
Figure 7B:
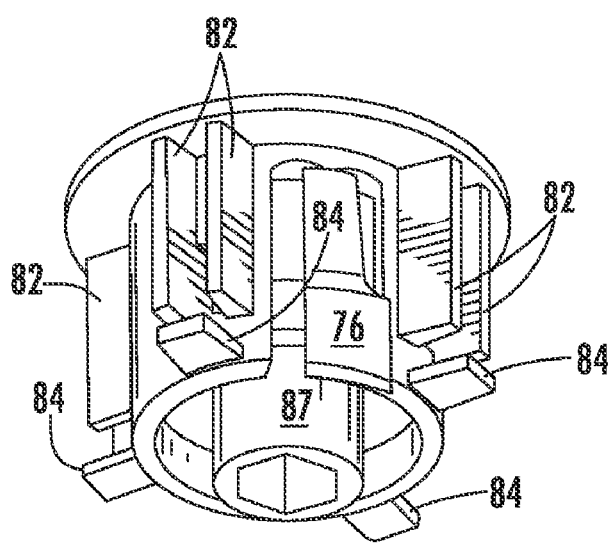
FIG. 7B is a perspective view of a spring adjusting device of FIG. 7A, taken from below.

In a third embodiment of the present invention, as shown in FIGS. 7A and 7B, spring adjusting device 34" is a telescoping spring base 74 that is movably mounted to support member 32. Telescoping spring base 74 has one or more locking members 76 that each engages a corresponding recess or channel or groove 78 in support member 32 and adjacent telescoping spring base 74. Further, telescoping spring base 74 has a top surface or platform 80 for supporting a spring 36", similar to spring 36, for urging contact member 38 upwardly.

Telescoping spring base 74 has a plurality of ribs 82 spaced above locating tabs 84. Initially, ribs 82 move vertically in grooves 78. When spring base 74 is fully raised, base 74 may be rotated so that it receives a platform 85 of support member 32 between ribs 82 and tabs 84. Locking member 76 is a resilient projection extending downwardly from platform 80 of telescoping spring base 74. When base 74 is at the raised position and rotated about 45 degrees in either direction, a lower portion of locking member 76 extends outwardly from base 74 to engage recess 78 to prevent further rotation and/or lowering of base 74 (FIG. 7A). A spindle 84 is provided for maintaining spring 36" in a vertical orientation. Optionally, and as shown, telescoping spring base 74 may have a cylindrical recess 86 for receiving and partially enclosing the spring 36". Spring 36" contacts and is supported by a lower inner surface (not shown) of cylindrical recess 86 when spring 36" is installed therein. Telescoping spring base 74 may be grasped directly and rotated by hand from below, for example, or may include a handle or tool receiver 87 to facilitate rotation by hand or with a tool, such as a screwdriver or wrench or the like.

Accordingly, it may be observed that raising telescoping spring base 74 and then rotating base 74 about 45 degrees so that locking member 76 engages recess 78, causes spring 36" to urge contact member 38 upwardly so as to cause drive belt 26 to frictionally engage and drive rollers 24. By pressing radially inwardly on locking member 76, locking member 76 disengages from recess 78 so that telescoping spring base 74 may be rotated about 45 degrees and then lowered vertically relative to support member 32 until contact member 38 is displaced downwardly, thus moving drive belt 26 out of engagement with rollers 24.

Figure 9:
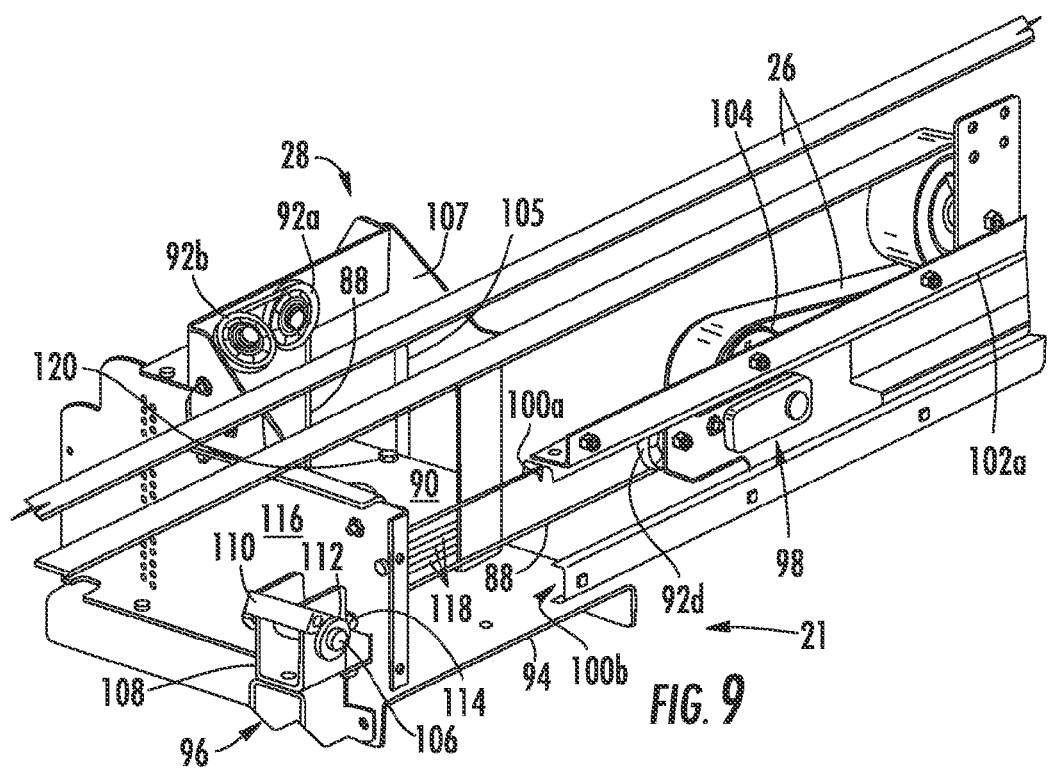
FIG. 9 is a perspective view of the gravity take-up device of FIG. 8, taken from the side, top, and opposite end thereof.

Referring now to FIGS. 8-11B, gravity take-up 28 includes a cable 88, a mass 90, and a plurality of pulleys or sheaves 92 for routing cable 88 and for applying tension to drive belt 26. Mass 90 is suspended above a platform 94 of frame 21 by cable 88. Cable 88 is routed vertically upward from mass 90 to a first sheave 92a, then horizontally to a second sheave 92b, then diagonally downwardly to a third sheave 92c, from which cable 88 is routed horizontally to a fourth sheave 92d, and finally to a winch assembly 96 mounted to frame 21. Fourth sheave 92d is rotatably connected to a bracket assembly 98, which is movably received in channels 100a, 100b of guide members 102a, 102b (FIG. 9). A belt pulley 104 is rotatably supported at bracket assembly 98, opposite fourth sheave 92d, and has drive belt 26 reeved upon it. The range of travel of bracket assembly 98 along guide members 102a, 102b is approximately equal to the distance between mass 90 and first sheave 92a when mass 90 is lowered to platform 94, and may be longer or shorter depending on the application and size constraints. It will be appreciated that the number of sheaves and the routing of cable may be varied or changed according to the particular application.

An aperture or window 105 is provided at a vertical plate 107 of frame 21, adjacent mass 90, to permit viewing of the height of mass 90 above platform 94 so that an operator may readily observe when mass 90 should be raised. A scale or indicator (not shown) may be included at window 105 for more clearly indicating the height of mass 90 above platform 94.

As best seen in FIGS. 8 and 9, winch assembly 96 includes a spindle 106 rotatably mounted in a winch frame 108 with a ratcheting device or pawl 110 pivotably mounted to frame 108 for selective engagement with a gear 112 at an end portion of spindle 106. Cable 88 may be routed through a hole or a passageway 114 in a vertical plate 116 of gravity take-up 28 and wound around spindle 106 of winch assembly 96. Pawl 110 may be manually-engaged, gravity-engaged, or spring-biased, for example, to engage with gear 112 to prevent winch assembly 96 from releasing or paying out cable 88 and lowering mass 90. Winch assembly 96 may be used to compensate for stretch in cable 88 and/or drive belt 26, and further, permits the use of drive belts of various lengths.

Figure 11B:
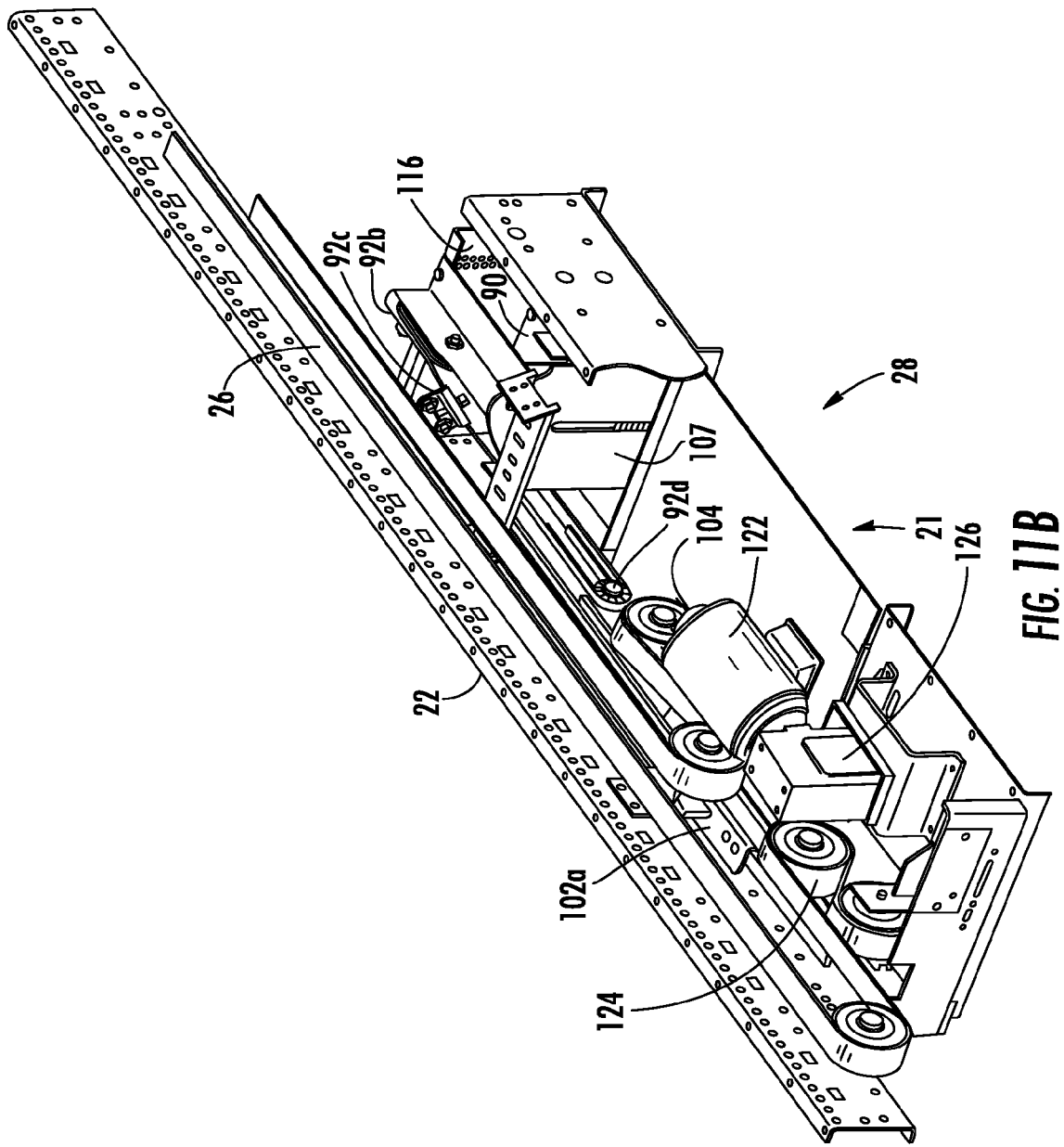
FIG. 11B is a perspective view of the gravity take-up device of FIG. 11A, having a motor and gearbox installed thereon.

Drive belt 26 is driven by an electric motor 122 supported on frame 21. Motor 122 drives a pulley 124 via a gearbox 126 (FIG. 11B). Drive belt 26 is reeved around pulley 124, which frictionally engages belt 26. Gearbox 126 converts rotary output from motor 122 by turning the axis of rotation by about 90 degrees and, optionally, by reducing the speed of the output. It will be appreciated that various power supplies may be used without departing from the spirit and scope of the present invention. For example, a hydraulic motor, pneumatic motor, combustion engine, or the like may be used to drive belt 26, and may do so via direct drive, drive shaft, or gearbox.

Thus, for example, drive belt 26 may be installed at roller transport conveyor 20 and reeved around pulley 104 of gravity take-up 28 while mass 90 rests upon platform 94 and cable 88 is slack. Then, spindle 106 of winch assembly 96 is turned to draw cable 88 into winch assembly 96, thereby raising mass 90 a desired distance above platform 94. Over time, cable 88 and/or drive belt 26 may stretch, especially if they are new, and may wear such that their respective lengths increase over time. It will be appreciated that any increase in length of the drive belt 26 will result in a corresponding movement of bracket assembly 98 along channels 100a, 100b, causing cable 88 to be fed downwardly from first sheave 92a, such that mass 90 is lowered toward platform 94. Substantially constant tension is maintained in drive belt 26 by maintaining mass 90 at a position spaced apart from and above platform 94. Therefore, to maintain substantially constant tension in drive belt 26 and to prevent mass 90 from contacting platform 94, winch assembly 96 may be used to wind cable 88 onto spindle 106, thereby once again raising mass 90 relative to platform 94. Therefore, the amount of belt stretch that can normally be accommodated is typically primarily limited by the range of travel of bracket assembly 98 along channel 100 of guide member 102.

Mass 90 may be fixed or adjustable in weight. It may be adjustable by including a plurality of plates 118 connected to one another by one or more fasteners 120. Thus, plates 118 may be added or subtracted from mass 90 to adjust the desired amount of tension in drive belt 26. Alternative masses are envisioned that may include, for example, a concrete block or a holding tank for containing a flowable medium such as dry sand or water. A holding tank permits adjustment of the weight of the mass, and thus the tension on the belt, by adding or removing the flowable medium to or from the tank.

Thus, tension is imparted to cable 88 via gravity acting upon mass 90. Cable 88 applies a resultant force F (FIG. 8) upon fourth sheave 92*d* that is transmitted to drive belt 26 via pulley 104 and bracket assembly 98. The tension in cable 88 is approximately equal to the weight of mass 90, minus any frictional losses or other losses that may occur in gravity take-up 28. Winch assembly 96 is operable to raise and lower mass 90 to service or replace drive belt 26, for example, and to adjust for belt stretch, cable stretch, and variations in the lengths of the cable and the drive belt. Turning spindle 106 in a first direction causes second end portion 88*b* of cable 88 to wind upon spindle 106 so that mass 90 is raised above platform 94 to apply force F to fourth sheave 92*d* and to place drive belt 26 in tension. Pawl 110 prevents cable 88 from unwinding from spindle 106. Releasing pawl 110 permits an operator to turn spindle 106 in a second direction to unwind cable 88 from spindle 106 so that mass 90 is lowered toward platform 94. When mass 90 contacts and is fully supported by platform 94, slack is imparted to cable 88 and also to drive belt 26, whereupon drive belt 26 may be removed from conveyor 20.

Accordingly, roller transport conveyor 20 provides carriage assemblies 30 for raising drive belt 26 into frictional contact with rollers 24 for driving the rollers. Springs provide the force for urging drive belt 26 into frictional contact with rollers 24, and therefore a separate electrical, hydraulic, or pneumatic actuator and power source are unnecessary for raising the contact member 38 to urge the drive belt 26 upwardly. Additionally, gravity take-up 28 provides constant tension on drive belt 26 with a wide range of adjustability to compensate for wear or stretch, and further provides a simple method of adjustment.

The spring-supported carriage urges the drive belt, which is driven by the electric motor, into frictional contact with the undersides of conveying rollers for rotating the rollers. The springs for supporting the carriages are adjustable and/or movable to facilitate maintenance, setup, and transport of the conveyor. The take-up maintains substantially constant tension in the drive belt and is adjustable to compensate for significant belt stretch or to accommodate belts of various lengths. The roller transport conveyor is operable without need for electrical or hydraulic or pneumatic power beyond that which may be used to drive the drive belt and rollers.

Changes and modifications in the specifically described embodiments may be carried out without departing from the principles of the present invention, which is intended to be limited only by the scope of the appended claims, as interpreted according to the principles of patent law including the doctrine of equivalents.

The embodiment of the present invention in which an exclusive property or privilege is claimed are defined as follows:

1. A transport conveyor comprising:
   a frame;
   a motor, said motor supported at said frame;
   a plurality of rollers, said rollers rotatably supported at said frame;
   an endless drive belt driven by said motor, said drive belt adapted to drive said rollers; and
   a carriage assembly supported at said frame, said carriage assembly comprising a support member, a contact member, a spring, and a retraction device;
   wherein said contact member is supported at said support member and adapted to engage said drive belt, wherein said spring is disposed between said support member and said contact member and is adapted to bias said contact member upwardly to bias said drive belt upwardly into contact with said rollers, and wherein said retraction device is supported at said support member and adapted to selectively retain said contact member to lower said drive belt out of contact with said rollers, wherein said retraction device comprises a movable clasp for engaging said contact member to selectively retain said contact member.

2. The transport conveyor of claim 1, further comprising a lever operatively connected at said clasp for moving said clasp to permit said retraction device to not retain said contact member.

3. The transport conveyor of claim 1, further comprising a gravity take-up, said take-up comprising:
   a mass supported at said frame;
   a cable having a first end portion and a second end portion, said cable adapted to support said mass in suspension, wherein said first end portion is connected at said mass and said second end portion is connected at said frame;
   a bracket assembly at said frame, said bracket assembly adapted to engage said cable between said first end portion and said second end portion; and
   a pulley, said pulley being rotatably coupled to said bracket assembly and engaging said endless drive belt;
   wherein said mass imparts tension to said cable and said cable transmits the tension to said belt via said bracket assembly.

4. The transport conveyor of claim 3, further comprising a winch at said frame for windably receiving said cable at said second end portion, wherein said winch is operable to shorten said cable to thereby raise said mass.

5. The transport conveyor of claim 4, wherein said winch comprises a ratcheting device to selectively prevent said cable from unwinding from said winch.

6. The transport conveyor of claim 3, further comprising a first sheave above said mass, a second sheave spaced horizontally from said first sheave, a third sheave spaced horizontally and vertically from said second sheave, and a fourth sheave spaced horizontally from said third sheave at said bracket assembly, wherein said cable is reeved around said sheaves.

7. The transport conveyor of claim 3, further comprising at least one guide member, wherein said bracket assembly is adjustably mounted at said at least one guide member.

8. A transport conveyor comprising:
   a frame;
   a motor, said motor supported at said frame;
   a plurality of rollers, said rollers rotatably supported at said frame;
   an endless drive belt driven by said motor, said drive belt adapted to drive said rollers; and
   a carriage assembly supported at said frame, said carriage assembly comprising a support member, a contact member, a spring, and a retraction device;
   wherein said contact member is supported at said support member and adapted to engage said drive belt, wherein said spring is disposed between said support member and said contact member and is adapted to bias said contact member upwardly to bias said drive belt upwardly into contact with said rollers, and wherein said retraction device is supported at said support member and adapted to selectively retain said contact member to lower said drive belt out of contact with said rollers, wherein said retraction device comprises an adjustable base at a bottom portion of said spring, said adjustable base being moveable between a retracted position and an extended position relative to said support member, and wherein said retraction device further comprises an outer element having a passageway through which said adjustable base is received, said adjustable base being rotatable relative to said outer element, a spiral channel at one of said outer element and said adjustable base, and an axial protrusion at the other of said outer element and said adjustable base, wherein said axial protrusion is operatively received in said spiral channel so that rotation of said adjustable base relative to said outer element causes said adjustable base to telescopically extend from said outer element.

9. The transport conveyor of claim 8, wherein said retraction device further comprises a locking member at said adjustable base, wherein said locking member engages said support member when said retraction device is in the extended position to prevent said support member from moving to the retracted position.

10. The transport conveyor of claim 9, wherein said locking member prevents rotation of said retraction device relative to said support member when said locking member is in said elevated position.

11. The transport conveyor of claim 9, wherein said locking member is disengageable from said support member to permit said retraction device to move to the retracted position.

12. A method of performing service on a transport conveyor having a frame, a motor supported at said frame, a plurality of rollers rotatably supported at said frame, an endless drive belt driven by said motor, said drive belt selectively driving said rollers, and a carriage assembly supported at said frame, said carriage assembly comprising a support member, a contact member, and a spring, wherein said contact member is supported at said support member and wherein said spring is disposed between said support member and said contact member, and wherein said contact member engages said drive belt and said spring biases said contact member upwardly to bias said drive belt upwardly into contact with said rollers, said method comprising:
providing a retraction device supported at said support member and selectively retaining said contact member in a manually retracted position with said retraction device in one state to lower said drive belt out of contact with said rollers to perform service on the transport conveyor; and
allowing said contact member to be biased upwardly by said spring with said retraction device in another state to raise said drive belt into contact with said rollers to put said transport conveyor into operation.

13. The method of claim 12, wherein said retraction device comprises an adjustable base at a bottom portion of said spring, said adjustable base being moveable between a retracted position relative to said support member to retain said contact member in said manually retracted position and an extended position relative to said support member to raise said drive belt into contact with said rollers.

14. A method of performing service on a transport conveyor having a frame, a motor supported at said frame, a plurality of rollers rotatably supported at said frame, an endless drive belt driven by said motor, said drive belt selectively driving said rollers, and a carriage assembly supported at said frame, said carriage assembly comprising a support member, a contact member and a spring, wherein said contact member is supported at said support member and wherein said spring is disposed between said support member and said contact member; and wherein said contact member engages said drive belt and said spring biases said contact member upwardly with said spring to bias said drive belt upwardly into contact with said rollers, said method comprising:
providing a retraction device supported at said support member, wherein said retraction device comprises a movable clasp; and
engaging said contact member with said clasp to selectively retain said contact member to lower said drive belt out of contact with said rollers to perform service on the transport conveyor.

15. The method claim 14, further comprising a lever operatively connected at said clasp and moving said clasp with said lever to permit said retraction device to not retain said contact member to put said transport conveyor into operation.

16. A method of performing service on a transport conveyor having a frame, a motor supported at said frame, a plurality of rollers rotatably supported at said frame, an endless drive belt driven by said motor, said drive belt selectively driving said rollers, and a carriage assembly supported at said frame, said carriage assembly comprising a support member, a contact member, and a spring, wherein said contact member is supported at said support member and wherein said spring is disposed between said support member and said contact member; and wherein said contact member engages said drive belt and said spring biases said contact member upwardly with said spring to bias said drive belt upwardly into contact with said rollers, said method comprising:
providing a retraction device supported at said support member, wherein said retraction device comprises an outer element having a passageway through which an adjustable base is received, a spiral channel at one of said outer element and said adjustable base, and an axial protrusion at the other of said outer element and said adjustable base, wherein said axial protrusion is operatively received in said spiral channel and wherein said adjustable base being rotatable relative to said outer element; and
rotating said adjustable base relative to said outer element to cause said adjustable base to telescopically move said adjustable base with respect to said outer element to lower said drive belt to a retracted position out of contact with said rollers to perform service on the transport conveyor.

17. The method of claim 16, wherein said retraction device further comprises a locking member at said adjustable base and engaging said support member with said locking member when said retraction device is in an extended position to prevent said support member from moving to the retracted position.

18. The method of claim 17 including disengaging said locking member from said support member to permit said retraction device to move to the retracted position.

* * * * *